(12) United States Patent
Heiter

(10) Patent No.: US 11,369,123 B2
(45) Date of Patent: Jun. 28, 2022

(54) DEVICE FOR DOSING A CONSUMABLE PRODUCT

(71) Applicant: BAYER FEINWERK GMBH & CO. KG, VS-Villingen (DE)

(72) Inventor: Uwe Heiter, Tuningen (DE)

(73) Assignee: BAYER FEINWERK GMBH & CO. KG, VS-Villingen (DE)

( * ) Notice: Subject to any disclaimer, the term of this patent is extended or adjusted under 35 U.S.C. 154(b) by 0 days.

(21) Appl. No.: 17/283,699

(22) PCT Filed: Oct. 9, 2019

(86) PCT No.: PCT/EP2019/077280
§ 371 (c)(1),
(2) Date: Apr. 8, 2021

(87) PCT Pub. No.: WO2020/074548
PCT Pub. Date: Apr. 16, 2020

(65) Prior Publication Data
US 2021/0345636 A1    Nov. 11, 2021

(30) Foreign Application Priority Data

Oct. 9, 2018  (DE) .................... 10 2018 124 828.8

(51) Int. Cl.
*A23G 1/20* (2006.01)
*A23G 3/02* (2006.01)
*G01F 11/02* (2006.01)

(52) U.S. Cl.
CPC .......... *A23G 1/206* (2013.01); *A23G 3/0257* (2013.01); *G01F 11/023* (2013.01)

(58) Field of Classification Search
CPC ..... A23G 1/206; A23G 3/0257; G01F 11/023; B05C 5/001; B05C 11/1042;
(Continued)

(56) References Cited

U.S. PATENT DOCUMENTS 712,649 A * 11/1902 Carlson ................ A23G 3/0257
222/255
1,477,085 A * 12/1923 Speck .................. A23G 3/0257
425/256
(Continued)

FOREIGN PATENT DOCUMENTS

DE    8235850 U1   10/1983
EP    0221369 A2    5/1987
(Continued)

OTHER PUBLICATIONS

International preliminary report on patentability for application No. PCT/EP2019/077280 dated Apr. 8, 2021.
(Continued)

*Primary Examiner* — Donnell A Long
(74) *Attorney, Agent, or Firm* — Bachman & LaPointe, P.C.

(57) ABSTRACT

An apparatus for dispensing a foodstuff a heating block (59) having a top side (60) and a bottom side (61), the bottom side (61) being complementary to a portion of the cylinder (11), the heating block (59) being removable from the housing (16) and from the container (1).

10 Claims, 13 Drawing Sheets

(58) Field of Classification Search
CPC .......... B67D 3/0022; B67D 7/80; B67D 7/82; B67D 7/0227; Y10T 137/6606
See application file for complete search history.

(56) References Cited

U.S. PATENT DOCUMENTS

| | | | | | |
|---|---|---|---|---|---|
| 1,498,546 | A | * | 6/1924 | Hislop | A23G 3/28 425/377 |
| 1,530,710 | A | * | 3/1925 | Baumgard | A23G 3/0257 137/334 |
| 1,564,637 | A | * | 12/1925 | Snyder | A23G 3/0247 425/308 |
| 1,622,115 | A | * | 3/1927 | Hontz | A23G 3/0257 425/313 |
| 1,683,506 | A | * | 9/1928 | Weaver | A23G 3/0257 222/255 |
| 1,696,845 | A | * | 12/1928 | Hislop | A23G 1/206 222/429 |
| 1,934,391 | A | * | 11/1933 | Vierow | A23G 3/0257 425/465 |
| 2,597,175 | A | * | 5/1952 | Perkins | A23G 3/0257 222/137 |
| 2,765,962 | A | * | 10/1956 | Perkins | F04B 1/00 222/255 |
| 2003/0025095 | A1 | * | 2/2003 | Sticht | F16K 31/025 251/129.01 |
| 2009/0101669 | A1 | * | 4/2009 | Hassler, Jr. | B05C 5/001 222/1 |
| 2014/0144947 | A1 | * | 5/2014 | Thibodeau | B67D 7/0227 222/386 |
| 2017/0121169 | A1 | | 5/2017 | Dailey et al. | |

FOREIGN PATENT DOCUMENTS

| | | |
|---|---|---|
| EP | 1145641 A2 | 10/2001 |
| GB | 1471347 A | 4/1977 |

OTHER PUBLICATIONS

International search report for patent application No. PCT/EP2019/077280 dated Jan. 6, 2020.

\* cited by examiner

DEVICE FOR DOSING A CONSUMABLE PRODUCT

BACKGROUND OF THE INVENTION

The invention is directed to a device for dosing a foodstuff with a housing, with a container for receiving the foodstuff, at the bottom of which at least one outlet opening, but preferably several outlet openings are arranged in a row, with at least one cylinder with a piston, with an inlet opening and an outlet opening, wherein for opening and closing the outlet opening of the cylinder an outlet valve opening upon pressure is provided in the cylinder, wherein a spray nozzle is preferably arranged at the outlet opening of the cylinder, wherein the end of the piston projecting from the cylinder is fastened to a carriage movable by means of a drive device in the direction of the longitudinal axis of the cylinders, and wherein a shelf for casting molds with cavities to be filled is provided below the spray nozzles.

Such a device for dosing foodstuff is known, for example, from the German utility model G 82 35 850.8 U 1. The device disclosed there is used for filling hollow bodies, e.g. of chocolate or similar confectionery products, with an edible filling mass, for example a truffle cream.

Another example is known from EP-A-0 221 369.

Furthermore, such a device is known from EP 1 145 641 B1. The device disclosed in the above-mentioned patent specification can be used flexibly and is suitable for small businesses. However, it often does not allow to bring the foodstuff in the container to the desired temperature without causing unwanted heating of heat-sensitive parts of the device and without the risk of burns for users. Furthermore, such a device is often expensive to manufacture.

The present invention seeks to overcome the disadvantages of the prior art.

SUMMARY OF THE INVENTION

To solve the problem, the invention proposes a heating block having a bottom side, the bottom side being complementary to a portion of the cylinder. Preferably, the heating block is removable from the housing and from the container. Preferably, the device comprises a plurality of cylinders. Accordingly, the bottom side is preferably formed complementary to corresponding portions of these cylinders.

The heating block may further comprise a top side, which may be complementary to a portion of the container.

Regardless of the design of the top side, a portion of the heating block may further be complementary to the outlet openings.

The container of the device is preferably removable from the housing. A check valve, which closes upon pressure, for opening and closing the outlet openings is preferably arranged at each outlet opening of the container, which is automatically closed when the container is removed. The inlet openings of the cylinder are connected to the outlet of the check valve, whereby the check valve is open when the container is placed on the housing and can be closed by pushing the piston into the cylinder.

Sections of the heating block that are not complementary to the cylinders can be surrounded by an insulating layer. Advantageously, the heating block can thus be operated in a very energy-saving manner, since only the cylinders need to be heated. The container does not have to be heated, since it has a large volume relative to the surface in contact with the food. Therefore, only a small amount of heat is extracted from the foodstuff present in the container via the walls or surfaces of the container, and heating of the container is therefore not necessary. The situation in the cylinders is exactly the opposite: There, relative to the surface area touched by the foodstuff, the volume occupied by the foodstuff is much smaller, and significantly more heat is therefore extracted from the foodstuff in the cylinders. For this reason, the cylinders are heated.

The container may include at least one side wall and a receiving space. The receiving space may include a bottom portion and at least one side portion, wherein a first portion of the side wall may form the side portion. Optionally, a second portion of the side wall may comprise a perforation located outside the receiving space. The perforation thus preferably extends along a contact point separating the side portion of the receiving space from the side wall or portions of the side wall located outside the receiving space.

The container may be made of high grade steel. If the container is heated, which may be provided according to an embodiment example, high grade steel is a particularly advantageous material: if the container is effectively heated, less heat is lost from the foodstuff to be consumed, since high grade steel conducts heat less effectively than other metals.

The container can be surrounded by an insulating jacket. This can be formed in one piece or in the form of individual elements, for example in the form of individual plates. This insulating jacket can both counteract heat loss and protect a user from burns.

Furthermore, a lid that is thermally insulated with respect to the container may be provided, which is also intended to prevent heat loss and prevent burns.

The heating block can essentially consist of aluminum. Preferably, however, the heating block comprises an insulating layer that is not made of aluminum but may be made, for example, of a nonwoven fabric. A heating foil may be considered, which is in contact with the aluminum and heats the heating block. Preferably, the heating block comprises a connection means for connection to the electric current or to a control device.

A connecting tube may be seated in the inlet opening of the cylinder, onto which the outlet opening(s) of the container is/are plugged. The bottom side of the heating block is preferably formed complementary to a section of the cylinder or cylinders and the connecting tubes.

At the bottom of the container for holding the foodstuff, which can be removed from the housing of the device according to the invention, several outlet openings are arranged in a row, each with a check valve. When the container is removed, the check valves close automatically so that any foodstuff still present in the container cannot leak out.

Depending, for example, on a type of a desired food product to be produced from the foodstuff, different types of foodstuffs may be considered.

The foodstuff is preferably free-flowing at processing temperature. For example, it may be liquid chocolate or another liquid foodstuff used for confectionery products. Furthermore, a raw mass for the production of sweets, wine gums, fruit gums or the like may also be considered. Such raw masses may require processing temperatures of up to about 150° C. At such high temperatures, which are not required for chocolate production, for example, the advantages of the heating block and the insulating layer become particularly apparent.

On the one hand, the foodstuff can be introduced into cavities of casting molds or hollow molds. Furthermore, it may be considered to fill the foodstuff into hollow molds or hollow bodies, for example hollow praline balls or the like. Numerous other ways of dispensing the foodstuff are conceivable.

With the container in place, the outlet openings of the container are each in communication with an inlet opening of a cylinder in which a piston is guided. An outlet opening is provided at the end of the cylinder, which is opened and closed by an outlet valve that opens when pressure is applied. When the container is placed on the cylinders, the check valve is opened so that foodstuff can flow from the container into the cylinder.

The cylinders are preferably individually insertable and removable between pins arranged on a bar.

A spray nozzle is arranged at the outlet opening of a cylinder, which is preferably pivotable about the longitudinal axis of the cylinder. The spray nozzle can be rotatably mounted by means of a sleeve fitted on the cylinder. The sleeve may be mounted on two preloaded O-rings to create friction and to allow it to be loosened and adjusted without tools. In addition, leakage of the foodstuff mass is prevented at this point.

The spray nozzle is not absolutely necessary, the foodstuff can also flow through the outlet opening directly into the cavity, hollow sphere or the like. Instead of the spray nozzle, a pipe, hose or the like can be considered.

In both a device having only one outlet opening in the bottom of the container and one cylinder, and a device having multiple outlet openings in the bottom of the container and multiple cylinders, it may be considered that the cylinder has multiple outlet openings, or more preferably, an outlet opening and a branched spray nozzle, branched conduit, branched hose, or the like.

The ends of the pistons projecting from the cylinder can be fastened to a carriage. Preferably, the ends of the pistons are formed with a rim that can be inserted into corresponding recesses with an undercut of the carriage. In a corresponding manner, a recess can also be provided at the end of the pistons, which can be held, for example, in corresponding undercuts of the carriage.

The carriage can be moved by a drive device in the direction of the longitudinal axis of the cylinders in order to move the pistons inserted inside the cylinders. The drive can be operated manually or mechanically, e.g. by means of an electric motor.

For example, the cable pull described in paragraphs [0013] and [0014] of EP 1 145 641 B1 can serve as the drive device. Alternatively, a crank drive or other arrangement may serve as the drive device. Furthermore, any drive devices which can cause a movement of the carriage and thus of the pistons inserted in the cylinders may be considered. Preferably, the drive device is designed to move the carriage along the longitudinal direction with as little lateral movement, twisting and jamming as possible, so that the same amount of foodstuff comes out of all the piston units.

Preferably, a stop limiting the piston movement is provided. A further embodiment of the device according to the invention provides for this stop to be adjustable so that the stroke of the pistons is adjustable.

A shelf is provided under the spray nozzles on which casting molds or hollow molds with cavities to be filled, hollow bodies such as hollow praline balls or the like can be positioned.

On the one hand, it may considered, for example, manually moving a mold or tray or the like containing hollow praline spheres in order to fill cavities or rows of hollow spheres arranged one behind the other.

On the other hand, a table may be arranged under the spray nozzles, which is preferably movable in steps in the direction of the longitudinal axis of the cylinders. It is particularly advantageous to couple the propulsion of the table with the propulsion of the carriage. It is further advantageous to make the height of the table adjustable. The table is used to hold the mold to be filled with cavities or to hold the hollow bodies to be filled, for example chocolate candies. The hollow bodies or cavities to be filled can be arranged on a pallet or on a blister forming rows and columns.

BRIEF DESCRIPTION OF THE DRAWINGS

With reference to the figures, an embodiment of the device according to the invention as well as details of the embodiment are described and explained.

In the drawings.

DETAILED DESCRIPTION

Figure 1:
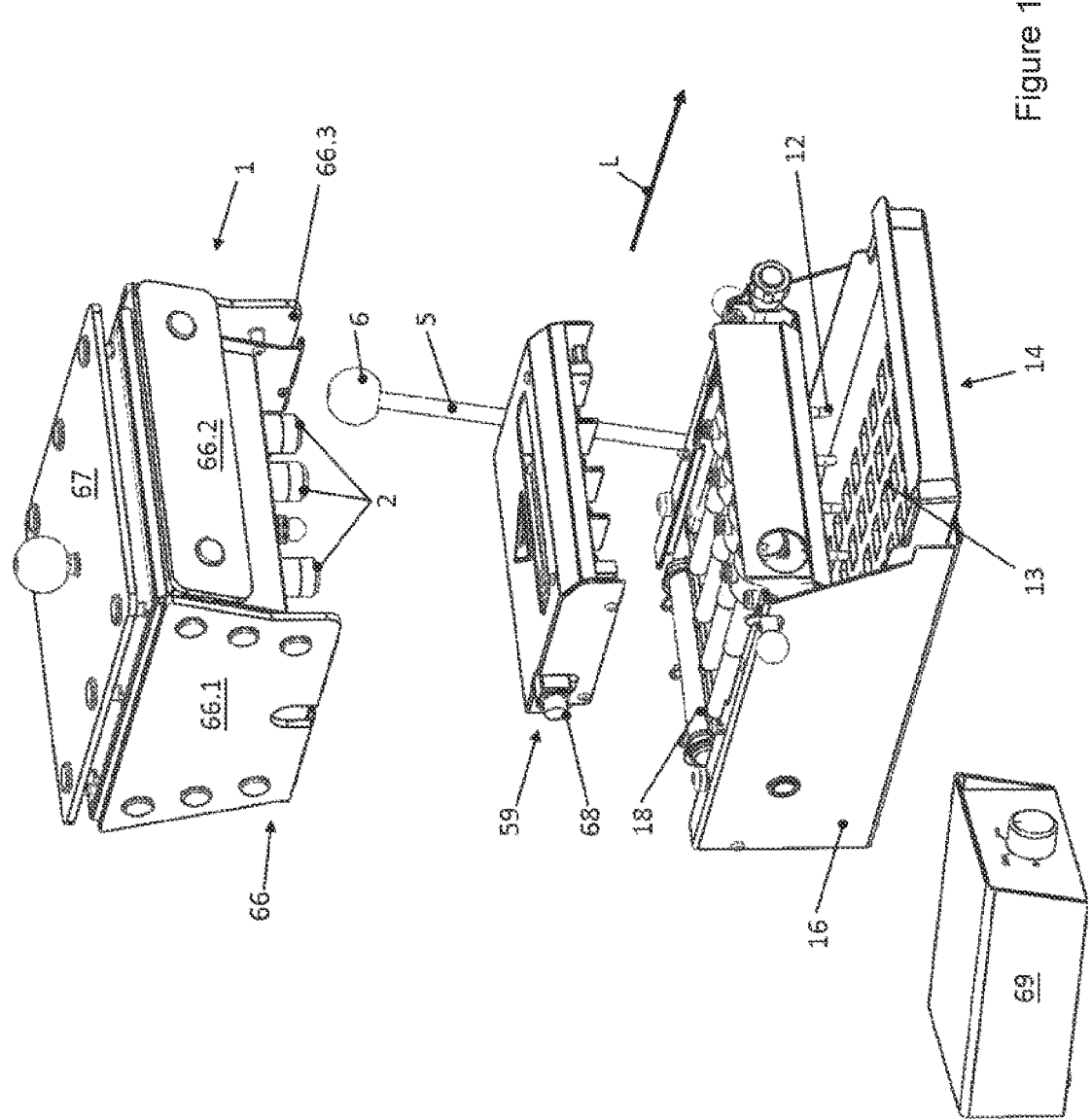
FIG. 1 an embodiment of a device according to the invention with removed container 1 and removed heating block 59 in front view, FIG. 2 a cutaway view of the device according to FIG. 1 from another perspective, whereby the container 1 is not shown.

FIG. 1 shows a perspective view of an embodiment of the device according to the invention with the heating block 59 removed and the container 1 removed.

A plurality of outlet openings 2 are arranged in series at the bottom 39 of a container 1 in which the foodstuff is located. Inside the housing 16, cylinders 11 are arranged below the outlet openings 2 of the container 1 in such a way that, in the assembled state, an outlet opening 2 is connected to an upper inlet opening 23 of a cylinder 11. A lower outlet opening with a spray nozzle 12, which is preferably pivotable, is arranged at the end of the cylinder. Below the spray nozzles 12, a shelf 15 is located in the housing 16, on which a mold 14 with the cavities 13 to be filled is located. Preferably, the shelf 15 is moved manually in the longitudinal direction L in order to position a new row of cavities 13 still to be filled under the spray nozzles 12.

By swiveling the spray nozzles 12 transversely to the longitudinal direction L, the device according to the invention can be optimally adapted to molds 14 with different distances between the cavities 13 in a row.

In each outlet opening 2 of the container 1 there is a check valve, not visible in FIG. 1, which closes automatically when the container 1 is removed and when there is no cylinder 11 under the outlet opening 2, so that no foodstuff can escape from these outlet openings 2.

Figure 4:
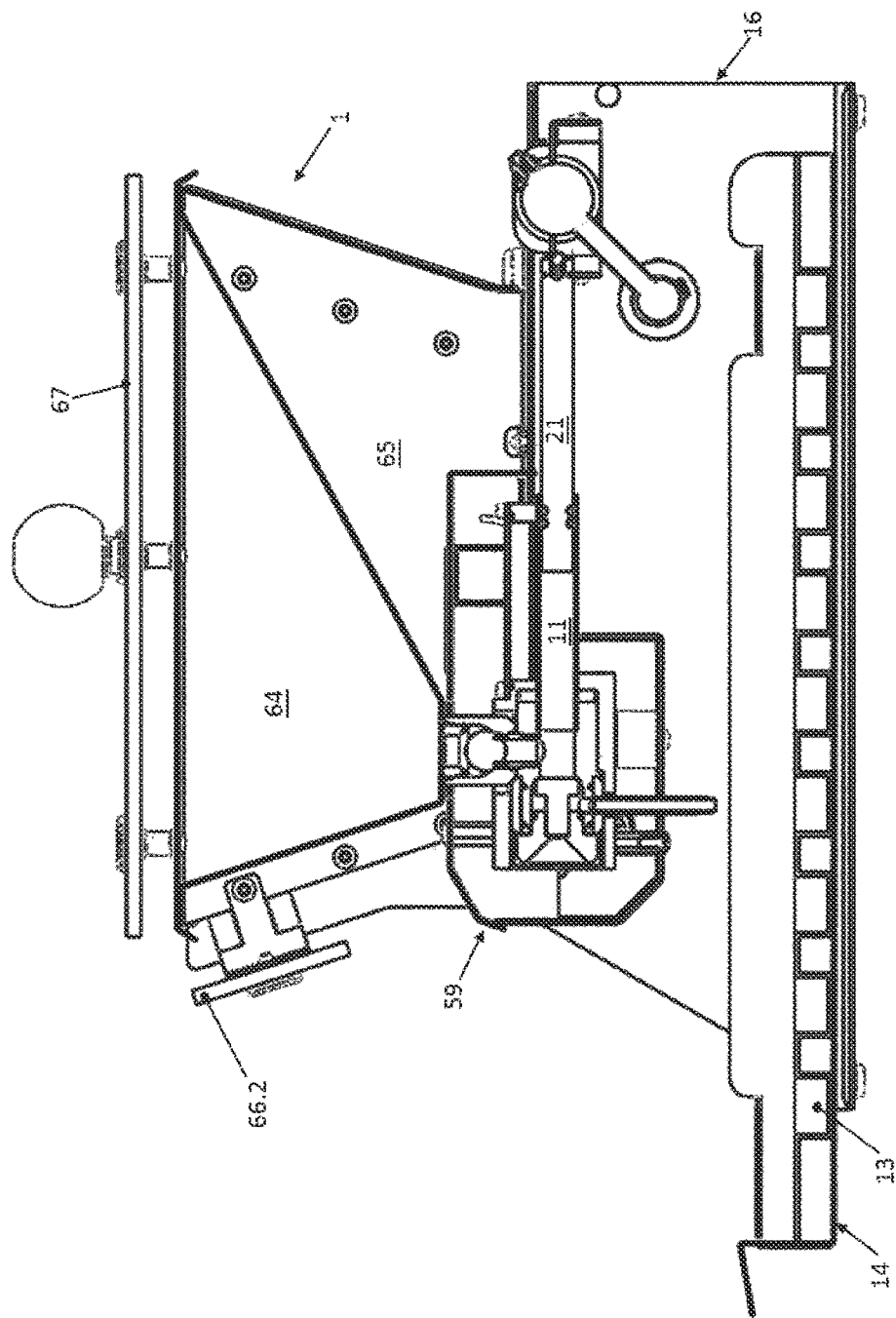
FIG. 4 shows the device according to FIG. 3 in the assembled state, FIG. 5 a view of an alternative device

The heating block 59 heats the outlet openings 2, the cylinders 11 and an area around the inlet openings 23 of the cylinders 11. This can also be seen in particular from FIG. 4. In order to protect a user from burns, the container 1 is surrounded by an insulating jacket 66, which can be made of several parts as shown in FIG. 1. The insulating jacket 66 thus consists of individual elements 66.1, 66.2, 66.3. For the same reason, the lid 67 is provided.

In particular, FIGS. 2 to 4 and 11 to 13 show further structural measures which are intended to supply the heat emanating from the heating block 59 as targeted as possible to the cylinders 11 and to the section around the inlet openings 23 of the cylinder 11. This reduces the risk of burns for the user on the one hand and energy consumption on the other. Thus, on the one hand, the heating block 59 is surrounded by an insulating layer 62 at the sections where no heat transfer is desired. Furthermore, a cover 33 is provided, which on the one hand serves as insulation and on the other hand protects a user from burns.

The heating block 59 is the only electrical component of the device shown in the figures and is easily separable from the remaining components and parts of the device. With regard to operational safety, for example during cleaning of the device, it is advantageous that the only electrical component can be removed in a simple manner.

Figure 2:
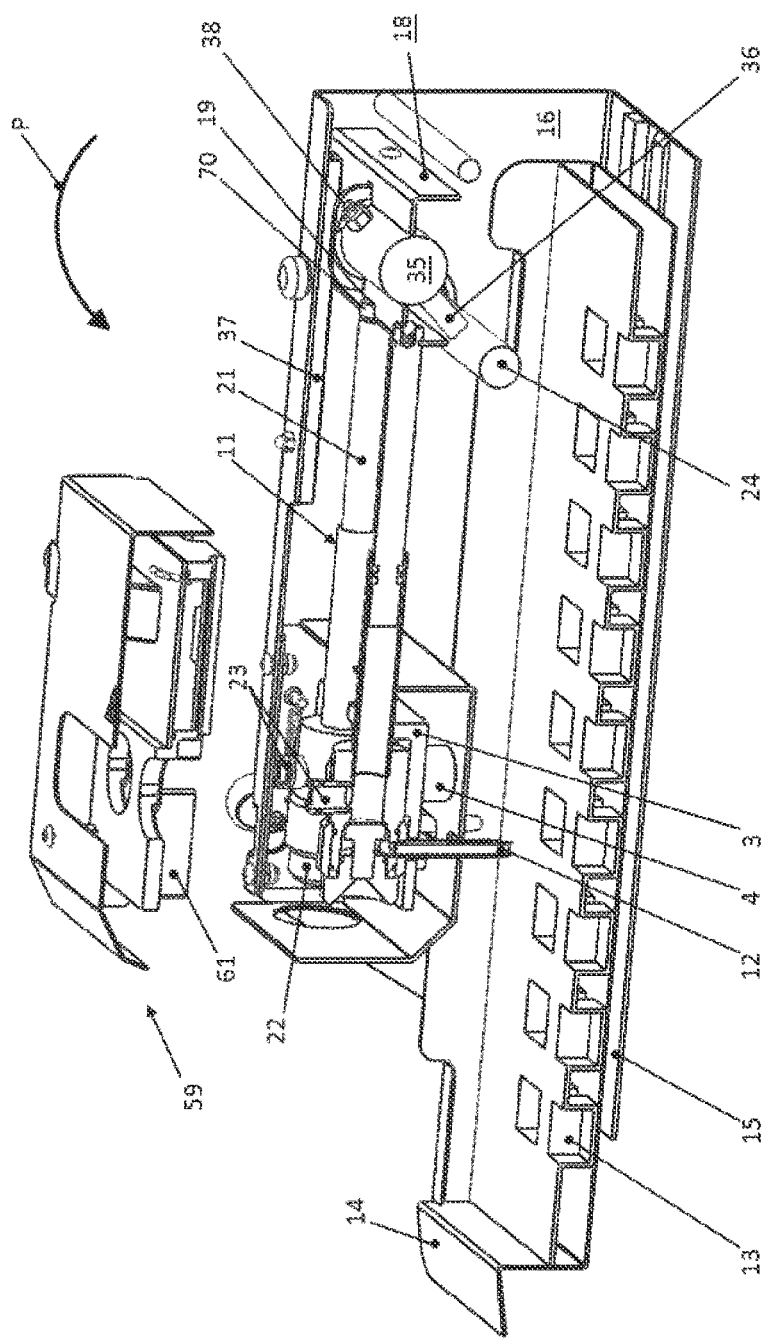
Figure 3:
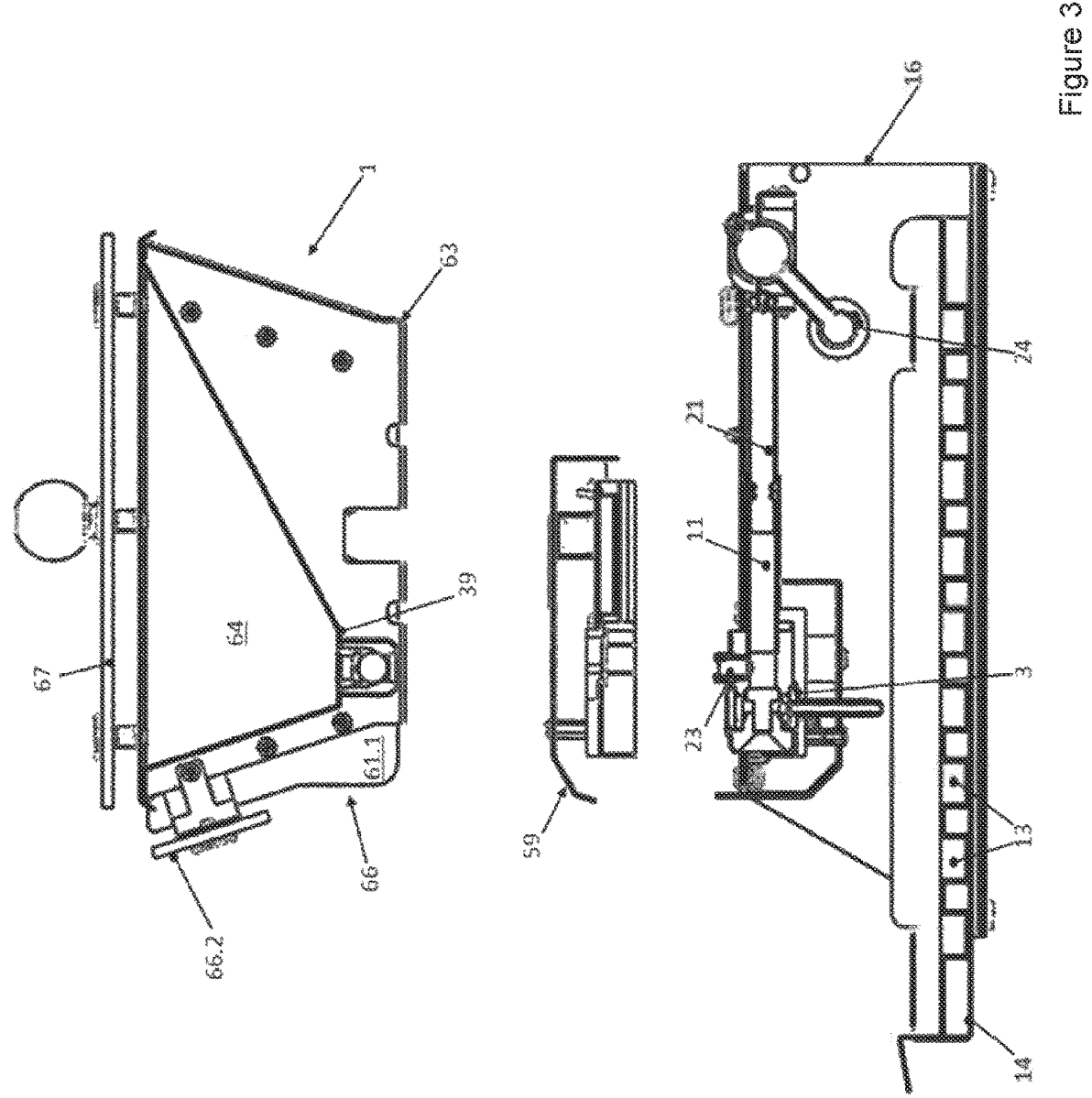
FIG. 3 is a side view of the device according to FIG. 1.

A drive shaft 24 arranged parallel to the bar 3 is rotatably mounted in the housing 16. Several pins 36 are arranged on the drive shaft 24, only one of which is shown in FIG. 2. Furthermore, the drive shaft 24 is connected to the lever 5 (not shown). Therefore, pressing the lever 5 down in the direction of an arrow P causes the drive shaft 24 to rotate in the direction of the arrow P.

A sliding element 35 is rotatably connected to the carriage 18. The carriage 18 is fastened on both sides with corresponding engagement elements (not shown) in a rail 37. The carriage 18 is therefore positively guided and can only move back and forth in the longitudinal direction L.

The sliding element 35 includes a plurality of holes (not visible in FIG. 2) through which the pins 36 are inserted and secured by a nut 38. The sliding element 35 can therefore slide down the pins 36, starting from the arrangement shown in FIG. 2. Since the sliding element 35 is connected to the carriage 18, which in turn is positively guided in the rail 37, rotation of the drive shaft 24 results in movement of the carriage 18 in the longitudinal direction L. Since a plurality of pins 36, preferably two or three pins 36, are present on the drive shaft 24, tilting of the carriage 18 is effectively avoided.

By pressing down this lever 5, the drive shaft 24 is thus rotated and ultimately the carriage 18, to which the ends of the pistons 21 inserted in the cylinders 11 are attached, is pulled forwards in the longitudinal direction L. The pistons 21 are then pushed into the cylinders 11. As a result of this movement, which can be carried out by hand, for example, but also by machine, the pistons 21 are pressed into the cylinders 11, as a result of which foodstuff is forced out of the spray nozzles 12. This process will be explained in detail later on with the aid of more suitable figures—FIGS. 7 to 9.

The mold 14 with the cavities 13 to be filled lies on the shelf 15. The cylinders 11, which are closed at their front end with a cap 22, rest on a bar 3 inserted between two pins 4 in each case. On the right and left of the cylinders 11 there is a recess formed complementary to the pins 4, so that the cylinders 11 are firmly fixed. Pistons 21 project from the rear end of the cylinders 11, the ends 70 of which are plate-shaped. The ends 70 of the pistons 21 are inserted in corresponding recesses 19 of the carriage 18, which comprise an undercut for fixing the end 70.

It is especially advantageous that each cylinder 11 can be inserted between two pins 4 on the bar 3 and the plate-shaped end 70 of the piston 21 in the corresponding recess 19 with the undercut of the carriage 18. As a result, the cylinders 11 with the pistons 21 can be easily inserted into the device and also removed again. As already mentioned, the number of cylinders 11 and their distribution on the bar 3 can be selected as desired.

Figure 6:
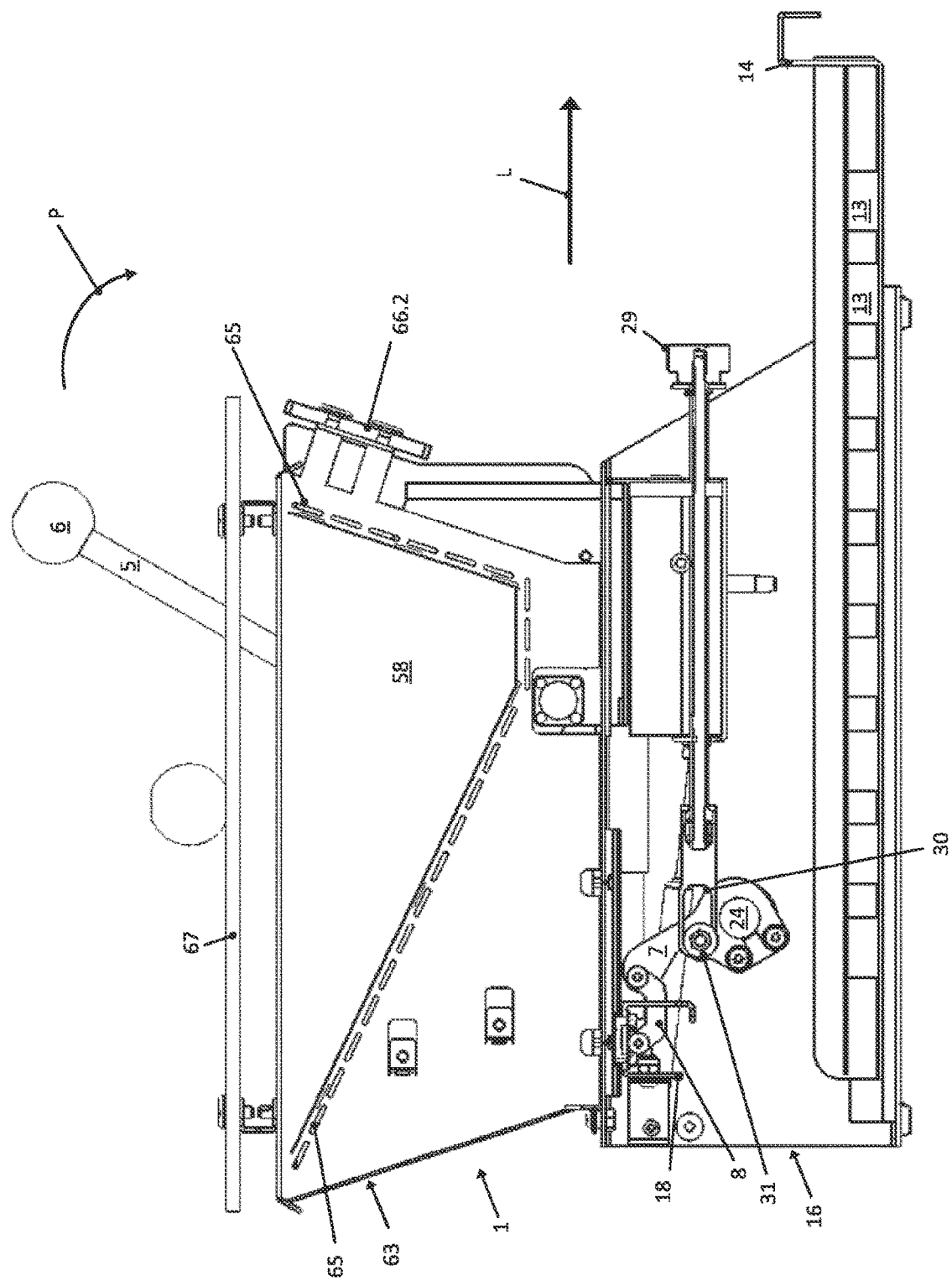
FIG. 6 is a cutaway side view of the alternative device, showing details of the crank mechanism and a set screw 29.

A set screw or adjusting wheel 29 is visible on the side of the housing 16. FIG. 6 in particular shows how this set screw 29 is used to adjust a longitudinal hole 30, which serves as a stop, in or opposite to the longitudinal direction L. The longitudinal hole 30 forms a stop for a bolt or screw 31 which is fixed to the first driver element 7. Here, the longitudinal hole 30 limits the movement of the bolt or screw 31 and thus of the piston 21 opposite to the longitudinal direction L and thus serves as a rear stop. The set screw 29 is thus used to set the piston stroke or the filling quantity of the cylinder 11. The further the longitudinal hole 30 is displaced in the longitudinal direction L, the lower the filling quantity of the cylinder 11.

The function of the set screw 29 in the device according to FIGS. 1 to 3 and 14 is analogous to that described above for the alternative device according to FIG. 6.

Figure 11:
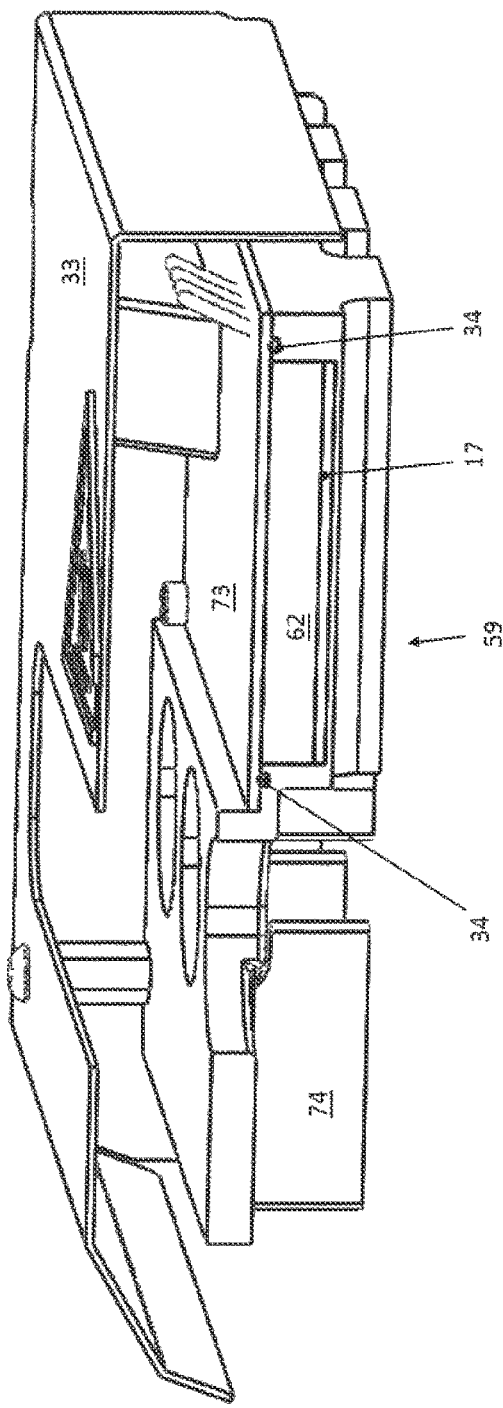
Figure 13:
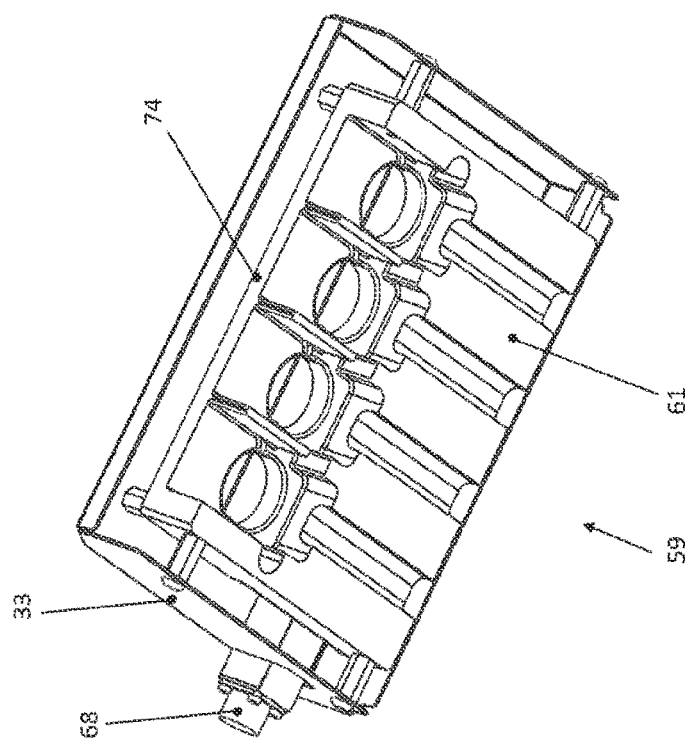
FIGS. 12 and 13 show the heating block 59 of the devices according to FIGS. 1 to 4 from different perspectives and in FIG. 14 shows a cutaway side view of the device according to FIGS. 1 to 4.
Figure 12:
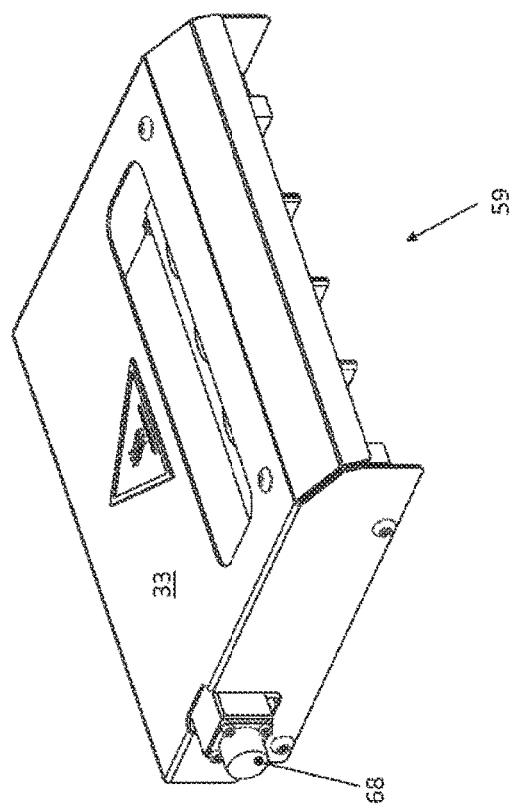
Figure 14:
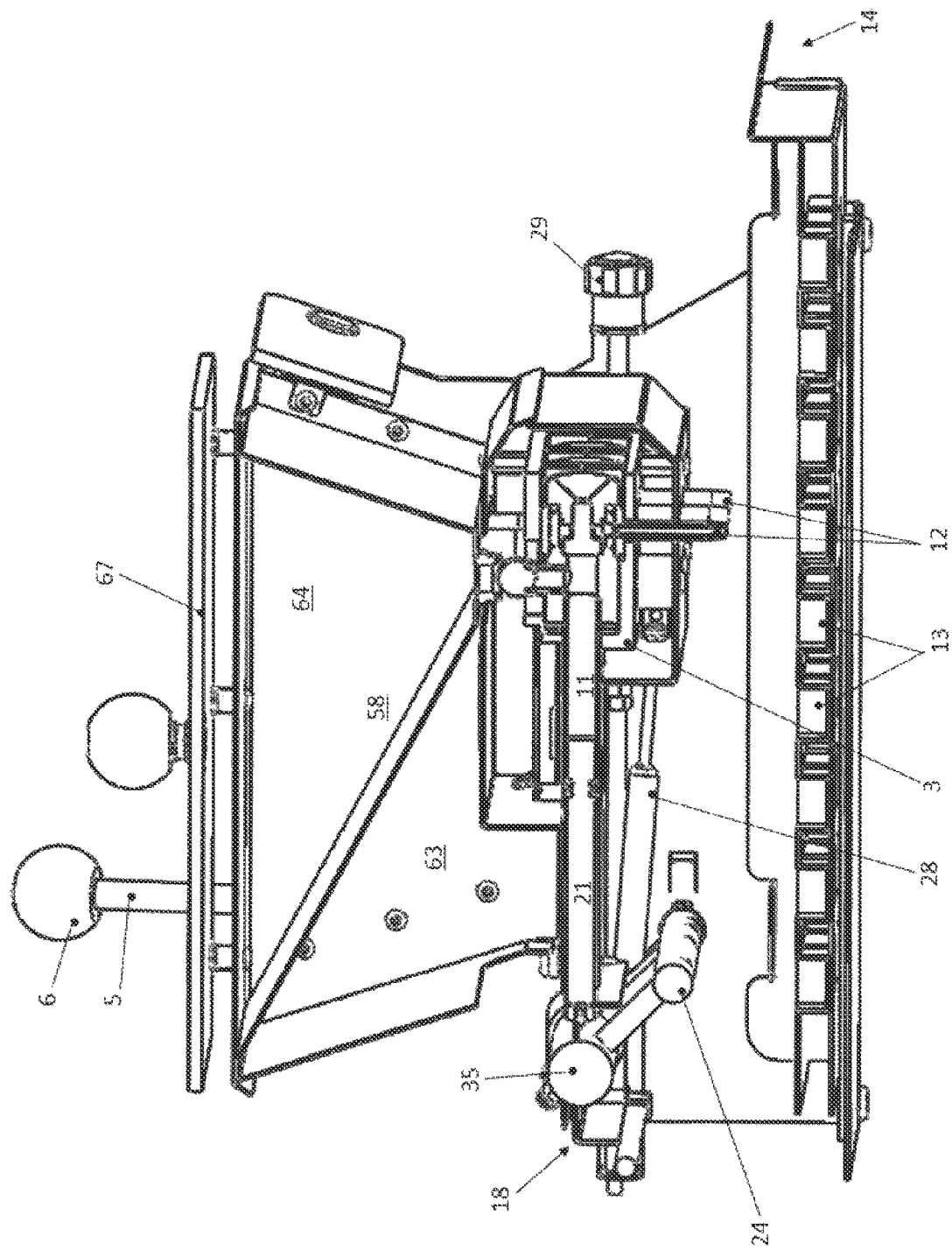

FIG. 11 shows the heating block 59 with the heating foil 17, which is not shown in the other figures for the sake of clarity. The heating foil 17 lies directly against an aluminum core 74 of the heating block 59 and is protected against external influences. The heating foil 17 heats the aluminum core 74 of the heating block. The heating foil 17 is supplied with power via the connection means 68 shown, for example, in FIG. 1, which cannot be seen in FIG. 11. The O-rings 34 provide fluid-tight insulation, which together with the wall element 73 protect the heating foil 17.

Figure 7:
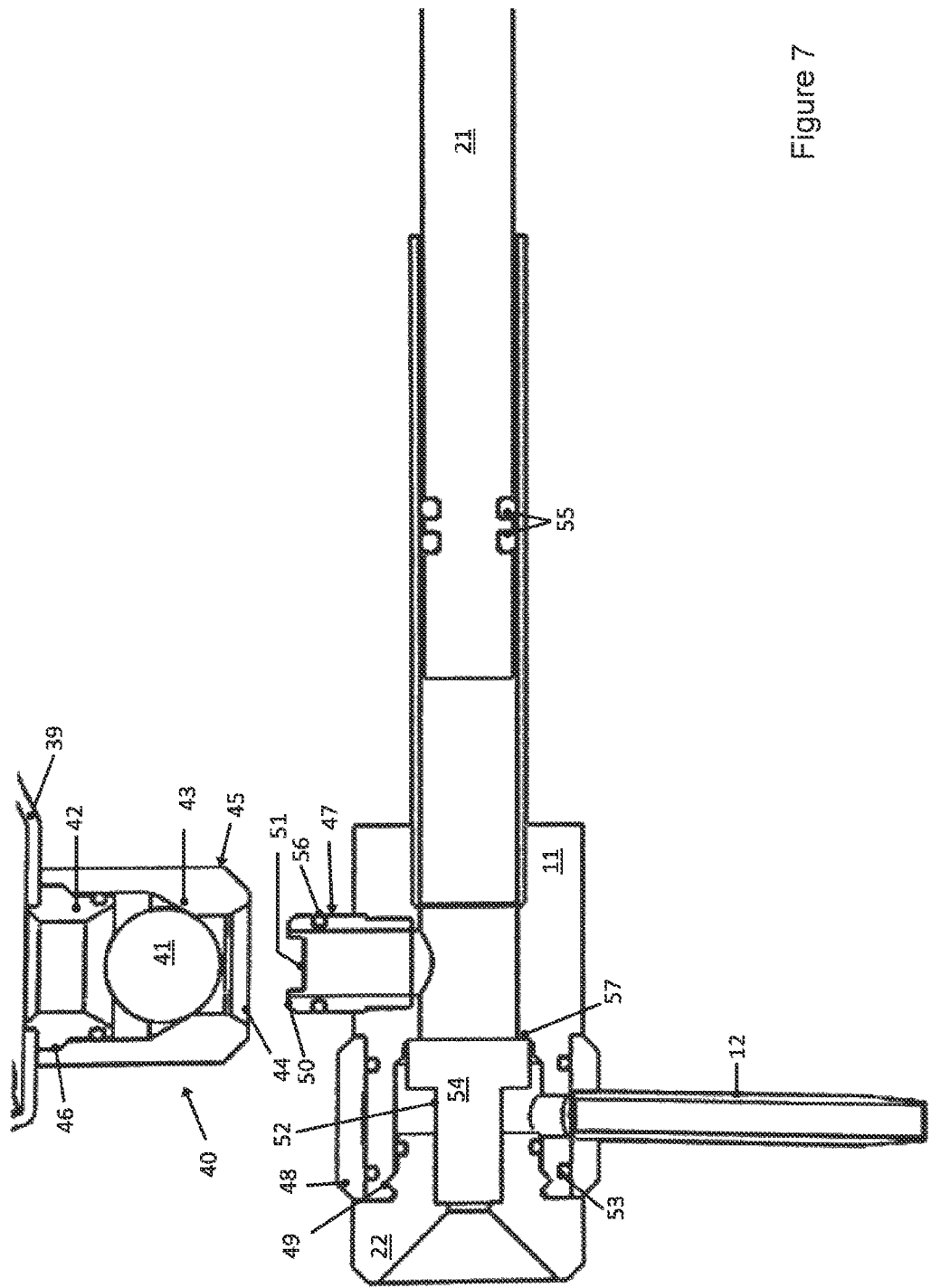
FIG. 7 shows a cylinder end with an inlet and outlet opening, with a piston, with an outlet valve and a spray nozzle as well as an outlet opening with a check valve of the container separate from the cylinder in longitudinal cutaway view, FIG. 8 the cylinder end with the inlet and outlet opening, with the piston, with the outlet valve and the spray nozzle as well as with the outlet opening fitted onto the inlet opening of the cylinder with the check valve of the container in longitudinal cutaway view, during suction of the foodstuff from the container.

FIG. 7 shows an outlet opening with a check valve of the container 1 and, below, a cylinder 11 in longitudinal cutaway view. The container 1 is removed from the cylinder 11.

In the bottom 39 of the container 1, an upper valve seat 42 is fixed in an opening, to which, for example by means of a thread 46, a valve tube 45 with a lower valve seat 43 is fixed. Between the upper valve seat 42 and the lower valve seat 43 there is a ball 41 which, as a result of gravity and the foodstuff located in the container, rests tightly on the lower valve seat 43 so that no foodstuff can leak out of the container. The two valve seats 42 and 43 and the ball 41 form the check valve. The check valve is thus designed as a ball valve.

Below the check valve, FIG. 7 shows the cylinder 11 with the piston 21 in longitudinal cutaway view with a precise fit.

A connecting tube 47 with a ball seat 50 for the ball 41 is seated in an inlet opening of the cylinder 11 and is enclosed by a sealing ring 56 for sealing. A bridging 51 is provided at the ball seat 50 so that the ball 41 does not completely close the connecting tube 47. A sleeve 48 with the spray nozzle 12 is fitted onto the cylinder end. The sleeve 48 is mounted on two preloaded O-rings 53 so that the spray nozzle 12 can be pivoted. The cylinder end is closed by a cap 22 which is screwed to the cylinder 11 by means of a thread 49. Cap 22 is thus a removable and preferably has an external thread which is screwed to an internal thread 49 of the cylinder 11. Between the end of the cylinder 11 and the connecting tube 47, a stop 57 for a rubber piston 54 is incorporated in the cylinder 11. The rubber piston 54 is arranged between this stop 57 and the cap 22. In the unpressurized state of the cylinder 11, one end face of the rubber piston 54 presses against the stop 57, while the other end face presses against the cap 22. The stop 57, the rubber piston 54 and the cap 22 form the outlet valve 52 of the cylinder 11. Thus, the outlet valve 52 is made of an elastic material as an elastic valve 54.

Figure 8:
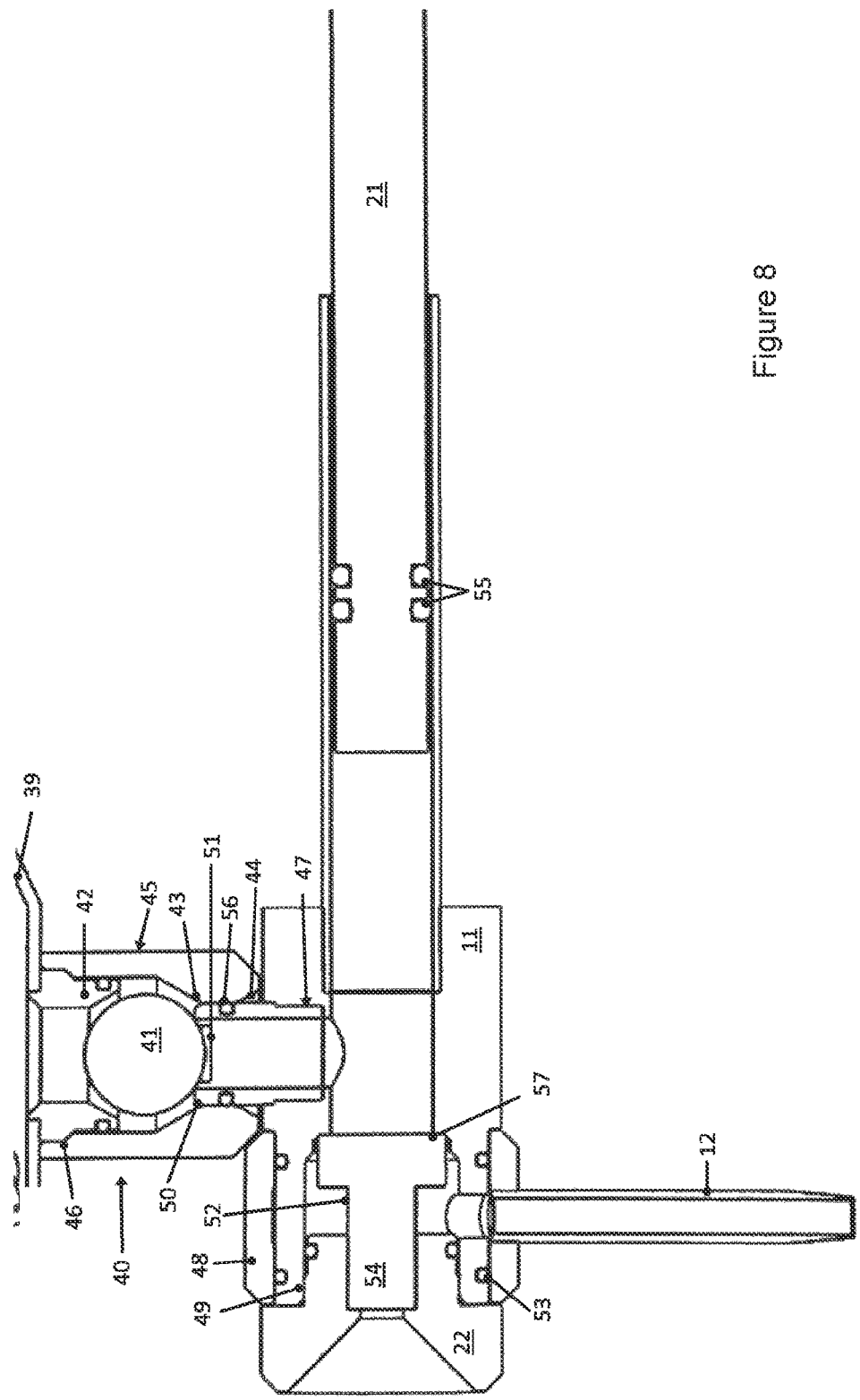

In FIG. 8, the valve tube 45 is seated on the connecting tube 47, as is the case when the container is seated. The ball 41 is lifted by the ball seat 50, but not pressed against the upper valve seat 42. Foodstuff material can therefore flow from the container around the ball 41—as indicated by the arrows—into the connecting tube 47 and from there further into the cylinder 11. When the piston 21 is retracted, the foodstuff is sucked into the cylinder 11 as a result of the suction effect. Because one end face of the rubber piston 54 presses against the stop 57, the outlet valve 52 of the cylinder 11 is closed so that no foodstuff can escape from the spray nozzle 12.

Figure 9:
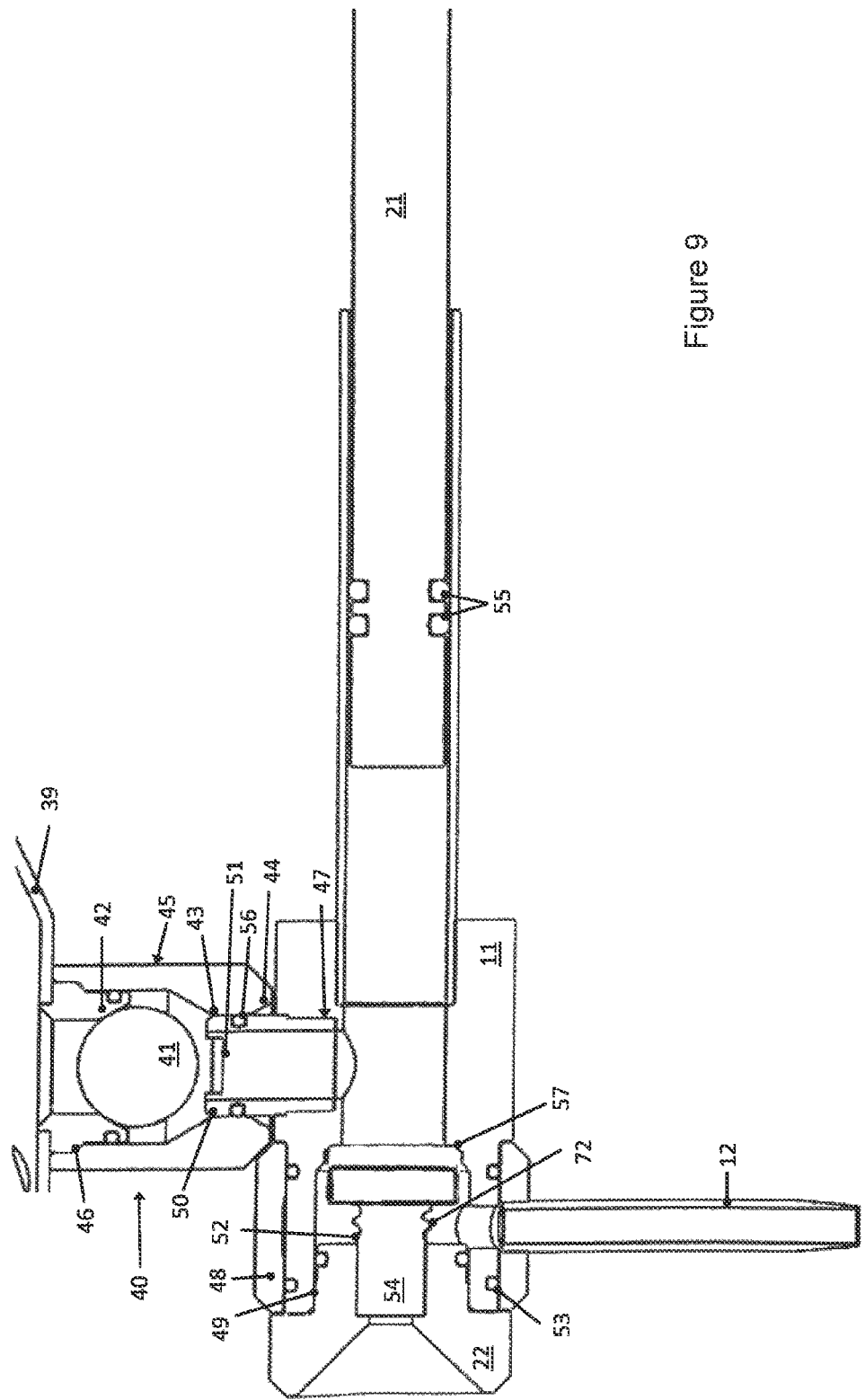
FIG. 9 shows the end of the cylinder with the inlet and outlet openings, with the piston, with the outlet valve and the spray nozzle, and with the outlet opening fitted onto the inlet opening of the cylinder with the check valve of the container in longitudinal cutaway view during pressing of the foodstuff from the cylinder, FIG. 10 an enlarged detailed view of a cutaway view of FIG. 5, in FIG. 11 shows the heating block 59 with a heating foil 17.

FIG. 9 shows how the foodstuff is pressed out of the cylinder 11.

For this purpose, the piston 21 is pressed into the cylinder 11 with the help of the carriage 18 by turning the lever 5, whereby a pressure is created so that the ball 41 is pressed against the upper valve seat 42 so that the container is sealed against the cylinder. Therefore, no foodstuff can flow from the container 1 into the cylinder 11, nor can it flow from the cylinder 11 back into the container 1. At the same time, the pressurized foodstuff presses the rubber piston 54 against the cap 22 so that the foodstuff flows out of the cylinder into the spray nozzle 12, at the end of which the foodstuff exits and flows into the cavities to be filled. Compression of the rubber piston 54 is indicated in FIG. 9 by protuberances 72. At the end of the filling process, the lever 5 is either released or moved back by the user opposite to the direction of the arrow P to an original position, as shown for example in FIG. 6. When the lever 5 is released, the gas spring 28, which was compressed when the carriage 18 moved in the longitudinal direction L, causes the carriage 18 to move opposite to the longitudinal direction L to a retracted position. Since the carriage 18 and the lever 5 are operatively connected to each other via the crank mechanism, the lever 5 can also be moved back to the original position after being released in a depressed position solely by a spring force of the gas spring 28. Furthermore, the lever 5 can alternatively or supportively be moved back to the original position manually. As soon as the movement of the lever 5 and at the same time of the piston 21, which is connected to it via the crank mechanism, in the direction of the original position begins, the rubber piston 54 is also abruptly moved back from the compressed or compressed position shown in FIG. 9 to its original position so that it rests against the stop 57 as shown in FIGS. 7 and 8. Thus, the flow of foodstuff material at the end of the spray nozzles 12 also breaks off cleanly. This means that as soon as the corresponding movement of the lever 5 or of the piston 21 in the direction of the original position begins, the rubber piston 54 expands again and closes the cylinder at the stop 57. The expansion of the rubber piston 54 creates a suction in the spray nozzle 12, which causes a clean break-off of the foodstuff stream at the end of the discharge nozzle 12. In this way, dripping of the foodstuff is effectively prevented.

The clear width of the cylinder decreases from the outside to the inside or from the end closed with the cap 22 to the rear. There are no undercuts. For these reasons, the cylinder can be cleaned easily and thoroughly when cap 22 is removed.

Partition walls may be provided in the container 1 between the outlet openings 2. These partitions make it possible to fill the container with different foodstuffs in order to fill hollow bodies or cavities with different foodstuffs in one operation. By swiveling two adjacent spray nozzles against each other, hollow bodies or cavities can even be filled with two different foodstuffs in one operation.

Figure 5:
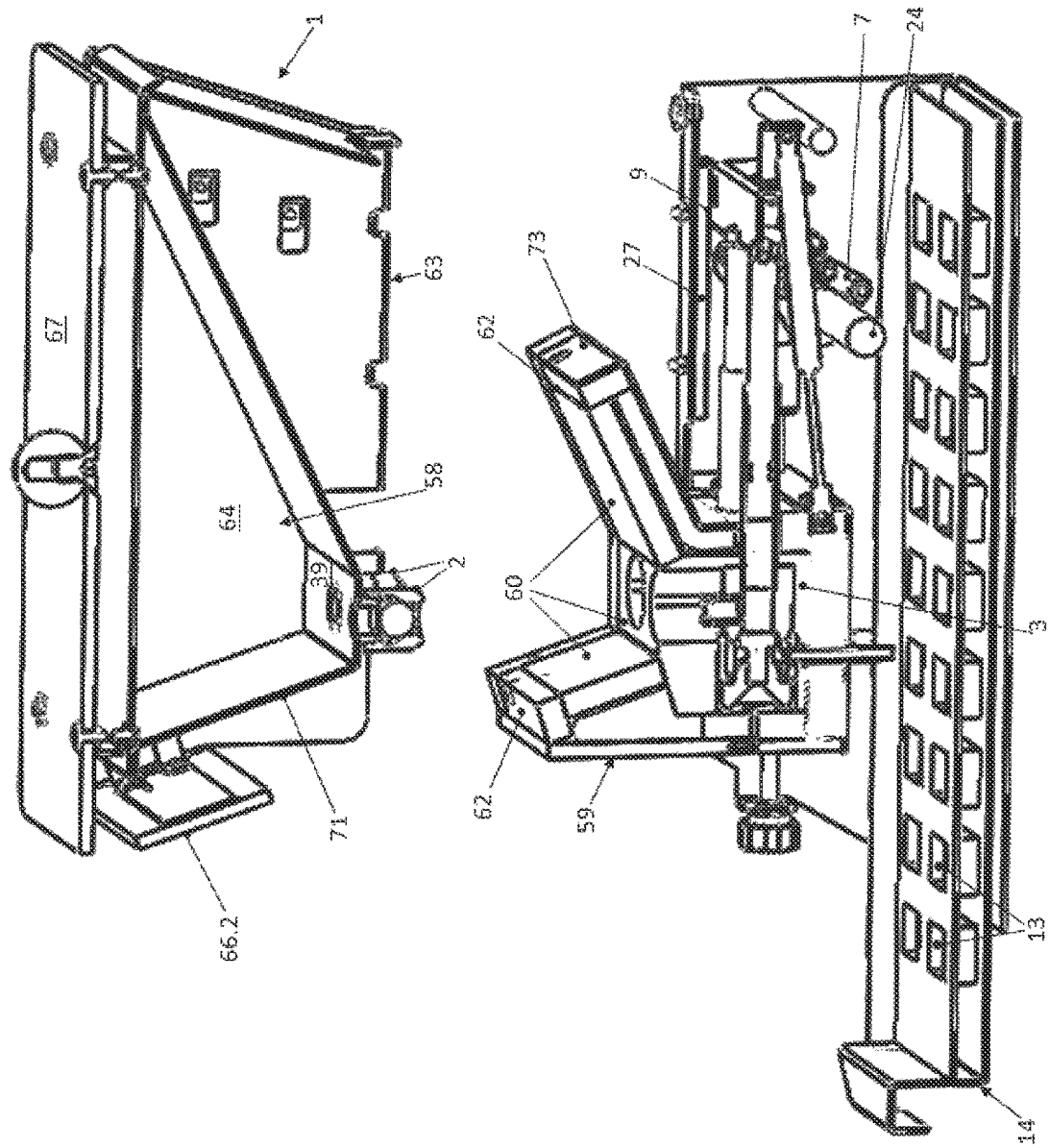
Figure 10:
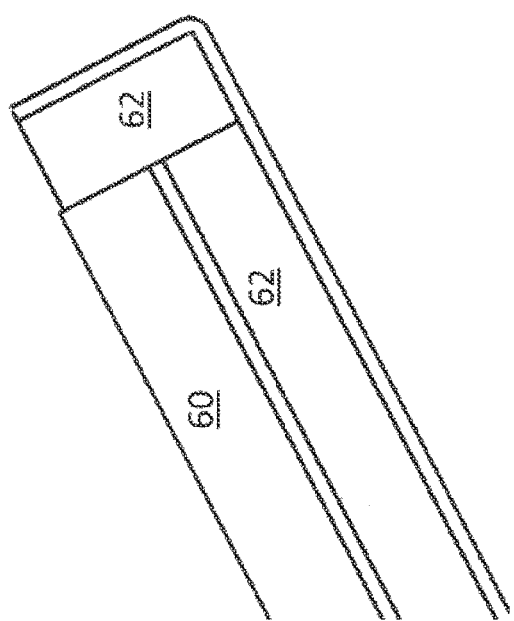

The alternative device shown in FIGS. 5, 6, and 10 includes substantially the same advantages already described with respect to FIGS. 1 through 4.

The alternative device shown in FIGS. 5 and 6 differs from the device shown in FIGS. 1 to 4 and 14, on the one hand, with respect to the heating block 59 and, on the other hand, with respect to the mechanism which converts the rotational movement of the drive shaft 24 into a linear movement of the carriage 18.

Hereinafter, only special features of the alternative device according to FIGS. 5 and 6 are discussed.

In addition to the outlet openings 2, the area around the inlet openings 23, and the cylinders 11, the heating block 59 also heats the container 1. In this regard, the heating block is configured such that its top side 60 effectively heats both the bottom 39 of the container and the wall elements 71 of the container 1 adjacent to the bottom 39, and thus also the foodstuff being consumed in the container 1.

Furthermore, heat transfer from the top 60 side of the heating block 59 to the container 1 takes place only via those sections where the bottom 39 and wall elements 71 of the container 1 are in direct contact with the top side 60. Those sections of the side walls 63 which do not provide walls of the container 1 in the form of side portions 64 are separated from the latter by a perforation 65 which significantly minimizes heat transfer. Thus, the heating block 59 heats primarily the wall elements 71 of the container which are in contact with its top side 60 and, via the heating of the foodstuff, also the side portions 64, but not the sections of the side walls 63 beyond the perforation 65.

FIGS. 5 and 10 show that the top side 60 of the heating block 59 is not aligned with adjacent surfaces of the insulating layer 62. In particular, the detailed view according to FIG. 10 shows that the top side 60 slightly overhangs the adjacent surface of the insulating layer 62. Thus, it is ensured that the entire top side 60 comes into surface contact with the wall of the container 1.

A drive shaft 24 arranged parallel to the bar 3 is rotatably mounted in the housing 16. At the right and at the left end of the drive shaft 24, a first driver element 7 is attached, which at one end encloses the drive shaft 24 and at the other end is connected in an articulated or rotatable manner to a second driver element 8, which in turn is fixed to the carriage 18. In particular, it can be seen from FIG. 6 that a movement of the lever 5 in the direction of an arrow P leads to a corresponding rotation of the drive shaft 24, which in turn causes the first driver element 7, which is non-rotatably seated on the drive shaft 24, to move the carriage 18 in the longitudinal direction L via the connection with the second driver element 8. Here, the ends 9 of the carriage within the slot 27. The driver elements 7, 8 thus form a crank drive together with the drive shaft 24. Although this is not visible in the figures for reasons of perspective, it should be emphasized that preferably two crank drives are seated inside the housing 16, on the left and right ends of the drive shaft 24, respectively. This arrangement of two crank drives ensures that the carriage 18 is movable along the longitudinal direction L with as little as possible lateral movements perpendicular to the longitudinal direction L, twisting and tilting.

Furthermore, the heating foil 17 is surrounded by a wall element 73.

As already mentioned, the device according to the invention is suitable for filling cavities or edible hollow bodies, such as chocolates, chocolate eggs and the like, with an edible foodstuff, the viscosity of which may be mushy, creamy, viscous or even slightly liquid. As a selection of examples of edible products, chocolate, cream truffle mass, wine gum, candy mass, marzipan, cream, honey, liqueur, schnapps or fruit juice may be mentioned.

An application of the invention in the cosmetic field is also conceivable. For example, a cosmetic cream, paste, milk, liquid, perfume, oil, lotion or the like can be filled into the hollow bodies or into the cavities in a metered manner.

In summary, the main advantages of the device according to the invention for filling hollow bodies or cavities are enumerated.

The container of the device can be removed at any time, e.g. to cool the foodstuff in a refrigerator or to heat it in a heating cabinet or to place another container with a different foodstuff on top. All the parts of the device that contain and conduct the foodstuff—the container, the cylinders, the pistons and the spray nozzles—can be separated from each other without tools. In addition, these parts are designed—no undercuts in the cylinder—so that they are easy to clean. Because the cylinders are individually removable, the device according to the invention can be adapted to hollow bodies or cavities of different sizes in just a few steps. Because the injection nozzles can be swiveled, optimum adaptation is possible when filling the hollow bodies to blisters or pallets with different gap spacings. The same applies to molds and the like with cavities of different sizes, which may have different gaps between them. A hollow body or cavity can be filled by means of two spray nozzles. Because of the partitions in the container, hollow bodies or cavities can be filled with different foodstuffs in a single operation. Because of the swiveling spray nozzles, one hollow body or cavity can also be filled with two different foodstuffs.

The device according to the invention can be operated very easily by semi-trained personnel. Furthermore, it is ergonomically designed in such a way that virtually fatigue-free operation is achieved. Instead of the manual drive, a mechanical drive, e.g. an electric motor, a hydraulic or a pneumatic cylinder, can be provided.

Despite the numerous advantages, the device according to the invention is characterized by low manufacturing costs, making it particularly well suited for small businesses.

Numerous variations of the variants and embodiments shown in the figures are conceivable, thus, the perforation 65 may be provided or omitted in any conceivable embodiment.

| List of reference signs | |
|---|---|
| 1 | Container |
| 2 | Outlet opening |
| 3 | Bar |
| 4 | Pin |
| 5 | Lever |
| 6 | Handle |
| 7 | first driver element |
| 8 | second driver element |
| 9 | End of carriage |
| 10 | |
| 11 | Cylinder |
| 12 | Spray nozzle |
| 13 | Cavity |
| 14 | Mold |
| 15 | Shelf |
| 16 | Housing |
| 17 | Heating foil |
| 18 | carriage |
| 19 | Recess |
| 20 | |
| 21 | Piston |
| 22 | Cap |
| 23 | Inlet opening |
| 24 | Drive shaft |
| 25 | |
| 26 | |
| 27 | Slot |
| 28 | Gas spring |
| 29 | set screw |
| 30 | Longitudinal hole |
| 31 | Bolt/Screw |
| 32 | |
| 33 | Cover |
| 34 | O-ringl |
| 35 | Sliding element |
| 36 | Pin |
| 37 | Rail |
| 38 | Nut |
| 39 | Bottom of the container |
| 40 | Check valve |
| 41 | Ball |
| 42 | Upper valve seat |
| 43 | Lower valve seat |
| 44 | Outlet opening |
| 45 | Valve tube |
| 46 | Thread |
| 47 | Connecting tube |
| 48 | Sleeve |
| 49 | Thread |
| 50 | Ball seat |
| 51 | Bridging |
| 52 | outlet valve |
| 53 | O-ring |
| 54 | Rubber piston |
| 55 | Sealing ring |
| 56 | Sealing ring |
| 57 | Stop |
| 58 | Receiving space |
| 59 | Heating block |
| 60 | Top side |
| 61 | Bottom side |
| 62 | Insulating layer |
| 63 | Side wall |
| 64 | Side portion |
| 65 | Perforation |
| 66 | Insulating jacket |
| 67 | lid |
| 68 | Connection means |
| 69 | Control device |
| 70 | End |
| 71 | Wall element |
| 72 | Protuberances |
| 73 | Wall element |
| 74 | Aluminum core |
| L | Longitudinal direction |
| P | Arrow |

The invention claimed is:

1. Device for dosing a foodstuff having a housing (16) with a container (1) for holding the foodstuff,
   comprising a receiving space (58), at a bottom (39) of which at least one outlet opening (2) is arranged,
   with at least one cylinder (11) with a piston (21),
   with an inlet opening (23) and an outlet opening,
   wherein an outlet valve (52) opening upon pressure is provided in the cylinder (11) for opening and closing the outlet opening of the cylinder (11),
   wherein the end of the piston (21) protruding from the cylinder (11) is movable on a drive device in the direction of the longitudinal axis of the cylinder (11), and further comprising
   a heating block (59) having a bottom side (61),
   the bottom side (61) is complementary to a portion of the cylinder (11),
   wherein the heating block (59) is removable from the housing (16) and from the container (1).

2. Device according to claim 1, wherein sections of the heating block which are not complementary to the cylinders (11) are surrounded by an insulating layer (62).

3. Device according to claim 1, wherein the container (1) comprises at least one side wall (63), and wherein the receiving space (58) comprises the bottom (39) and at least one side portion (64), wherein a first portion of the side wall (63) forms the side portion (64) and wherein a second portion of the side wall (63) comprises a perforation (65) located outside the receiving space.

4. Device according to claim 1, wherein the container (1) is made of high grade steel.

5. Device according to claim 1, wherein the container (1) is surrounded by an insulating jacket (66).

6. Device according to claim 1, further comprising a lid (67) which is thermally insulated with respect to the container.

7. Device according to claim 1, wherein the heating block consists essentially of aluminum.

8. Device according to claim 1, wherein the heating block comprises connection means (68) for connection to the electric current or to a control device (69).

9. Device according to claim 1, wherein a connecting tube (47) is seated in the inlet opening of the cylinder (11), onto which the outlet opening (2) or outlet openings of the container (1) is or are plugged, the bottom side (61) of the heating block being formed complementary to a portion of the cylinder (11) and the connecting tubes (47).

10. Device according to claim 1, wherein the heating block (59) comprises an top side (60) which is complementary to a portion of the container (1).

\* \* \* \* \*